United States Patent
Li (10) Patent No.: US 11,281,575 B2
(45) Date of Patent: Mar. 22, 2022

(54) METHOD AND SYSTEM FOR FACILITATING DATA PLACEMENT AND CONTROL OF PHYSICAL ADDRESSES WITH MULTI-QUEUE I/O BLOCKS

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 17 days.

(21) Appl. No.: 16/871,369

(22) Filed: May 11, 2020

(65) Prior Publication Data
US 2021/0349818 A1   Nov. 11, 2021

(51) Int. Cl.
*G06F 12/02*   (2006.01)
*G06F 12/06*   (2006.01)
*G06F 9/54*   (2006.01)
*G06F 1/30*   (2006.01)

(52) U.S. Cl.
CPC ............ *G06F 12/0246* (2013.01); *G06F 1/30* (2013.01); *G06F 9/544* (2013.01); *G06F 9/546* (2013.01); *G06F 12/063* (2013.01); *G06F 2212/7201* (2013.01); *G06F 2212/7209* (2013.01)

(58) Field of Classification Search
CPC .......... G06F 1/30; G06F 3/0604; G06F 3/061; G06F 3/0616; G06F 3/0656; G06F 3/0685; G06F 5/065; G06F 5/10; G06F 9/544; G06F 9/546; G06F 12/0246;
(Continued)

(56) References Cited

U.S. PATENT DOCUMENTS

| 3,893,071 A | 7/1975 | Bossen |
| 4,562,494 A | 12/1985 | Bond |
| 4,718,067 A | 1/1988 | Peters |

(Continued)

FOREIGN PATENT DOCUMENTS

| JP | 2003022209 | 1/2003 |
| JP | 2011175422 | 9/2011 |

(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Gary J Portka
(74) *Attorney, Agent, or Firm* — Shun Yao; Yao Legal Services, Inc.

(57) ABSTRACT

A system is provided to receive a request to write a sector of data to a non-volatile storage device, wherein the request is associated with a physical address in the non-volatile storage device at which the sector of data is to be written. The system identifies, based on the physical address, a channel buffer to which the sector of data is to be transmitted, and stores the sector of data in the channel buffer. Responsive to determining that the channel buffer stores other sectors, the system writes the sector of data and the other sectors of data to the non-volatile storage device based on the physical address.

17 Claims, 8 Drawing Sheets

(58) Field of Classification Search
CPC .............. G06F 12/063; G06F 13/1626; G06F 13/1631; G06F 13/1673; G06F 2003/0691
USPC .................. 710/52, 53, 74; 711/103, 154
See application file for complete search history.

(56) References Cited

U.S. PATENT DOCUMENTS

| | | |
|---|---|---|
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,747,202 B1 | 8/2017 | Shaharabany |
| 9,852,076 B1 | 12/2017 | Garg |
| 9,875,053 B2 | 1/2018 | Frid |
| 9,912,530 B2 | 3/2018 | Singatwaria |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,437,670 B1 | 10/2019 | Koltsidas |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1 | 7/2008 | Yim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1 | 5/2009 | Wheeler |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |

(56) References Cited

U.S. PATENT DOCUMENTS

| | | |
|---|---|---|
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1* | 7/2014 | Kuzmin ............ G06F 12/0246 711/103 |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1* | 11/2015 | Voigt ................ G06F 3/061 709/219 |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |

(56) References Cited

U.S. PATENT DOCUMENTS

| | | |
|---|---|---|
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1* | 10/2019 | Kachare ............... G06F 12/1009 |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. lenne, "Pheonix:Reviving MLC Blocks as SLC to Extend NAND Flash Devices Lifetime, "Design, Automation & Text in Europe Conference & Exhibition (DATE), 2013.

(56) References Cited

OTHER PUBLICATIONS

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

Arm ("Cortex-R5 and Cortex-R5F", Technical reference Manual, Revision r1p1) (Year:2011).

\* cited by examiner

FIG. 7

METHOD AND SYSTEM FOR FACILITATING DATA PLACEMENT AND CONTROL OF PHYSICAL ADDRESSES WITH MULTI-QUEUE I/O BLOCKS

BACKGROUND

Field

This disclosure is generally related to the field of data storage. More specifically, this disclosure is related to a method and system for facilitating data placement and control of physical addresses with multi-queue I/O blocks.

Related Art

Today, various storage systems are being used to store and access the ever-increasing amount of digital content. A storage system can include storage servers with one or more storage devices or drives, and a storage device or drive can include storage media with persistent memory, i.e., a non-volatile memory. Examples of a storage drive can include solid state drives (SSDs), such as a Peripheral Component Interconnect Express (PCIe) SSD and a Serial Advanced Technology Attachment (SATA) SSD. An improvement of a PCIe SSD over a SATA SSD is a multi-queue feature which can increase parallelism in processing I/O blocks. Multiple queues can result in both an improved Quality of Service (QoS) and an improved throughput, especially when handling frequent write operations in a multi-tenancy scenario. However, while multiple queues can result in certain improvements, some challenges exist. After the system processes data sectors via the multiple queues, the order of the data sectors can be unpredictable, as the assignment of physical addresses is based on the order in which the data sectors are received by a controller. This can result in a lack of control of the assigned physical addresses, which in turn can create challenges in customization and optimization.

Another challenge is that the mixture of "hot" and "cold" data (based on access frequency) can lead to a frequently triggered garbage collection and an increased write amplification, which can result in a decreased lifespan of the storage media. Yet another challenge is that the garbage collection stream is generally isolated from a host write stream, which may require that the system keep two parallel superblocks open. This can result in a sub-optimal usage of free blocks.

Thus, while the multi-queue feature can increase parallelism, some challenges still exist in providing a storage system which can efficiently and optimally use the multiple queues for input/output (I/O) blocks.

SUMMARY

One embodiment provides a system which facilitates operation of a storage system. During operation, the system receives a request to write a sector of data to a non-volatile storage device, wherein the request is associated with a physical address in the non-volatile storage device at which the sector of data is to be written. The system identifies, based on the physical address, a channel buffer to which the sector of data is to be transmitted. The system stores the sector of data in the channel buffer. Responsive to determining that the channel buffer stores other sectors, the system writes the sector of data and the other sectors of data to the non-volatile storage device based on the physical address.

In some embodiments, the physical address associated with the request is assigned by a host, the host determines the physical address based on a logical address for the data, and a flash translation layer module associated with the host maintains a mapping of the logical address to the assigned physical address.

In some embodiments, the request to write the sector is received by a controller.

In some embodiments, prior to identifying the channel buffer, the system processes the sector of data based on a logic module.

In some embodiments, the request to write the sector of data is received via a first queue of a plurality of queues. The other sectors of data are included in other requests received from other queues of the plurality of queues. The system determines that the channel buffer stores other sectors by: receiving, via the other queues, the other requests to write the other sectors of data to the non-volatile storage device, wherein the other requests are associated with physical addresses in the non-volatile storage device at which the other sectors of data are to be written, and wherein the other requests are received in a first order which is different from a second order in which the physical address for the sector of data and the physical addresses for the other sectors of data are assigned. The system stores the other sectors of data in the channel buffer based on the physical addresses associated with the other requests.

In some embodiments, the physical address for the sector of data and the physical addresses for the other sectors of data are assigned in a fixed order. The sector of data and the other sectors of data are written to the non-volatile storage device based on the assigned fixed order.

In some embodiments, the system writes the sector of data and the other sectors of data by: selecting a channel associated with the channel buffer; and writing the sector of data and the other sectors of data via the channel to the non-volatile storage device.

In some embodiments, the sector of data and the other sectors of data are written to the non-volatile storage device as a first physical unit, and a physical unit comprises a page of the non-volatile storage device.

In some embodiments, the first channel buffer comprises a battery-backed random-access memory. The system detects a loss of power, and writes incoming data received from a plurality of queues to a respective channel buffer. Responsive to determining, in the respective channel buffer, that a gap exists in a second physical unit or in a block which includes the second physical unit: the system writes dummy data to fill the gap; the system closes the second physical unit and the block; and the system updates a mapping table by invalidating entries corresponding to physical locations associated with the dummy data. The system writes data from the respective channel buffer to the non-volatile storage device.

In some embodiments, the system determines that the gap exists by one or more of: identifying a first gap between a write pointer and a last valid sector of the second physical unit; and identifying a second gap between a last valid sector and an end of the second unit or the block.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a storage system which addresses the issue of out-of-order data sectors in a multi-queue system.

As described above, using multiple queues can increase parallelism, which can result in both an improved Quality of Service (QoS) and an improved throughput, especially when handling frequent write operations in a multi-tenancy scenario. However, while multiple queues can result in certain improvements, some challenges exist. After the system processes data sectors via the multiple queues, the order of the data sectors can be unpredictable, as the assignment of physical addresses is based on the order in which the data sectors are received by a controller. This can result in a lack of control of the assigned physical addresses, which in turn can create challenges in customization and optimization. Another challenge is that the mixture of "hot" and "cold" data (based on access frequency) can lead to a frequently triggered garbage collection and an increased write amplification, which can result in a decreased lifespan of the storage media. Yet another challenge is that the garbage collection stream is generally isolated from a host write stream, which may require that the system keep two parallel superblocks open. This can result in a sub-optimal usage of free blocks. An exemplary prior art storage system depicting these challenges is described below in relation to FIG. 1.

Thus, while the multi-queue feature can increase parallelism, some challenges still exist in providing a storage system which can efficiently and optimally use the multiple queues for input/output (I/O) blocks.

The embodiments described herein provide a system in which a host-side flash translation layer (FTL) assigns a physical block address (PBA) to a data sector, and appends the PBA to the data sector. A controller in the storage device can receive the sector+PBA as incoming data from one of multiple queues. The storage device controller can include a PBA arbiter module, which can direct the incoming data from the multiple queues to a corresponding channel buffer based on the PBA appended to each incoming data sector. The system can then write the data from a channel buffer into the corresponding storage media. As a result, regardless of the sequence in which the controller receives the data sectors, the PBA arbiter in the controller can write each data sector into the corresponding channel buffer, and eventually into the physical location in the storage media based on the host-assigned PBA. An exemplary environment depicting management of physical addresses with multiple queues is described below in relation to FIG. 2; an exemplary controller and PBA arbiter is described below in relation to FIG. 3; and an exemplary channel buffer organization is described below in relation to FIG. 4.

Furthermore, a channel buffer can be a battery-backed RAM (e.g., SRAM), such that upon detecting a loss in power, the system can write incoming data from the multiple queues to a corresponding channel buffer, determine "holes" or gaps within physical units or pages to be written to in, e.g., NAND flash, and fill the gaps with dummy data, as described below in relation to FIG. 5B.

Thus, by providing a host-based FTL which assigns the physical addresses and collaborates with a device controller to control the sector order, the embodiments described herein can ensure both data consistency and operational efficiency.

A "distributed storage system" or a "storage system" can include multiple storage servers. A "storage server" or a "storage system" can refer to a computing device which can include multiple storage devices or storage drives. A "storage device," "storage drive," and "non-volatile storage device" refer to a device or a drive with a non-volatile memory which can provide persistent storage of data, e.g., a solid state drive (SSD), a hard disk drive (HDD), or a flash-based storage device. A storage system can also be a computer system.

A "computing device" refers to any server, device, node, entity, drive, or any other entity which can provide any computing capabilities.

A "physical unit" refers to a unit into which a memory media can be formatted, as multiple equal-length physical units of, e.g., a physical page of 128 bytes per page.

A "sector of data" or a "data sector" refers to a portion of data which can correspond to a LBA. In this disclosure, a sector of data is concatenated with its corresponding host-assigned PBA, and written as a "concatenated data portion" to a controller of a storage device.

A "PBA-arbiting module" or "PBA arbiter" can perform functions including but not limited to: identifying a channel buffer to which a sector of data is to be written, based on a corresponding PBA; directing or conducting incoming traffic to a controller, wherein the traffic is received via one or more queues; and transmitting the sector (or concatenated data portion which includes the corresponding PBA) to the identified channel buffer.

A "channel buffer" refers to a random-access memory which stores sectors to fill physical units of a non-volatile storage device, determines filled physical units, and transmits the filled physical units to the non-volatile storage device via a channel which corresponds to the channel buffer. In this disclosure, the channel buffer can be a battery-backed SRAM.

Figure 1:
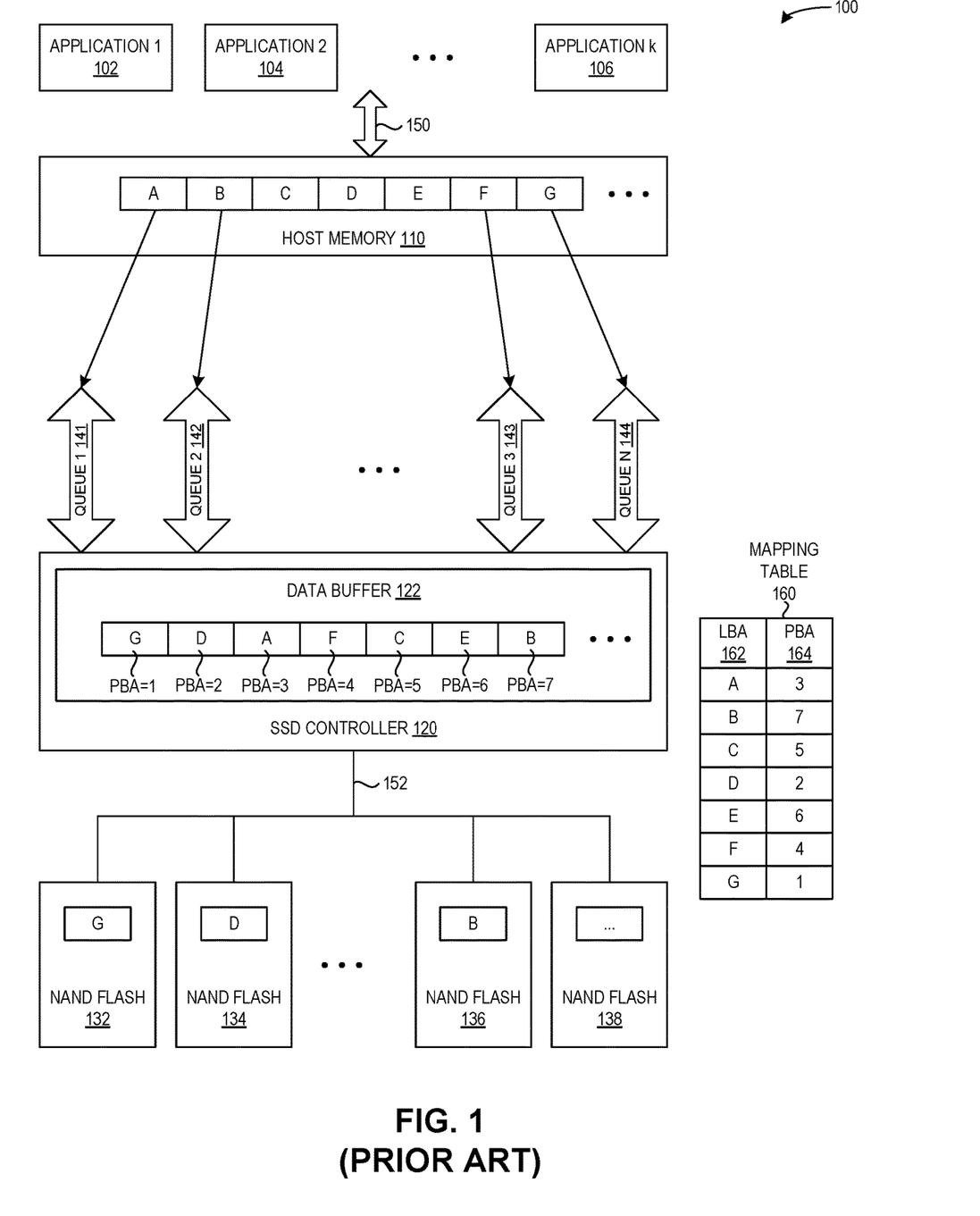
FIG. 1 illustrates an exemplary environment which facilitates operation of a storage system, including an out-of-order physical placement with multiple queues, in accordance with the prior art.

Exemplary Storage System in the Prior Art, Including Out-of-Order Physical Placement with Multiple Queues FIG. 1 illustrates an exemplary environment 100 which facilitates operation of a storage system, including an out-of-order physical placement with multiple queues, in accordance with the prior art. In environment 100, multiple applications or instances, such as an application 1 102, an application 2 104, and an application k 106, can communicate with a host memory 110. Host memory 110 can receive data comprising a plurality of sectors A, B, C, D, E, F, and G, which sectors are ordered as received from an application or instance, i.e., in an "original order." The data, in various sectors, can be passed through multiple queues, e.g., a queue 1 141, a queue 2 142, a queue 3 143, and a queue N 144.

However, when the data is received by an SSD controller 120, the data may be received out of order, and may be stored in a data buffer 122 of SSD controller 120 as, e.g., G, D, A, F, C, E, and B. As a result, the out-of-order data stored in data buffer 122 may be written to the NAND flash out of order, i.e., in an order which is different from the original order as received from the applications and stored in host memory. For example, sector G may be written to NAND flash 132, sector D may be written to NAND flash 134, sector B may be written to NAND flash 136, etc. The system may update a mapping table 160 only after SSD controller 120 receives the data based on the order received from multiple queues 1 141 to N 144. Mapping table 160 can include entries mapping a logical block address 162 to a physical block address 164. For example: sector G (with LBA=G) is mapped to PBA=1; sector D (with LBA=D) is mapped to PBA=2; sector A (with LBA=A) is mapped to PBA=3; sector F (with LBA=F) is mapped to PBA=4); sector C (with LBA=C) is mapped to PBA=5); sector E (with LBA=E) is mapped to PBA=6; and sector B (with LBA=B) is mapped to PBA=7.

Thus, the storage system of environment 100 cannot maintain the original order of the sectors of data in writing the data to the non-volatile storage device (e.g., the NAND flash).

This storage system has several limitations. First, the system has no control on the assignment of the physical addresses, because the assignment of a single PBA is based on the order in which the corresponding sector of data is received by the controller, via one of multiple queues. The system can store the LBA to PBA mapping, but the system loses control of the assignment of the physical address. This can create challenges in customization and optimization based on physical addresses. Second, the system mixes data associated with varying access frequency, e.g., "hot," "warm," and "cold" data. This can result in a frequently triggered garbage collection and an increased write amplification, which can in turn result in an increased wear leveling and a reduced lifespan of the physical storage media. Third, the system generally isolates a garbage collection stream from a host write stream, which may require that the system maintain two parallel superblocks in an open state. This can result in a sub-optimal usage of free blocks, and can also increase the risk associated with maintaining data consistency.

Thus, prior art environment 100 may be limited in optimizing the usage of multiple queues.

Figure 2:
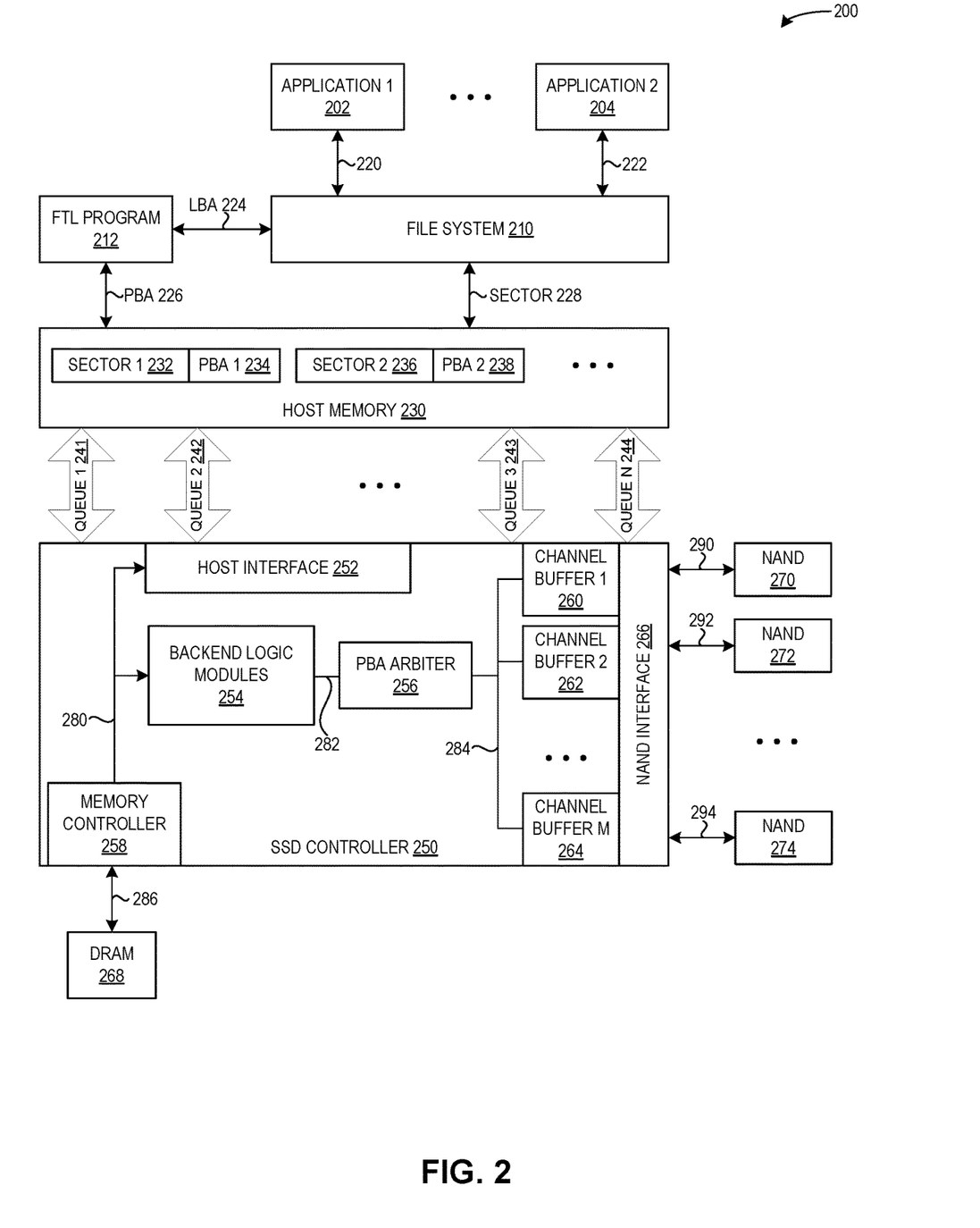
FIG. 2 illustrates an exemplary environment which facilitates operation of a storage system, including management of physical addresses with multiple queues, in accordance with an embodiment of the present application.

Exemplary Environment Including Management of Physical Addresses with Multiple Queues FIG. 2 illustrates an exemplary environment 200 which facilitates operation of a storage system, including management of physical addresses with multiple queues, in accordance with an embodiment of the present application. Environment 200 can include: an application 1 202 and an application 2 204; a file system 210; a flash translation layer (FTL) program 212; a host memory 230; multiple queues 1 241, 2 242, 3 243, and N 244; an SSD controller 250; a DRAM 268; and persistent storage media such as NANDs 270, 272, and 274.

During operation, file system 210 can receive from applications 1 202 and 2 204 data to be written to a non-volatile storage device (via communications 220 and 222). File system 210 can generate a plurality of sectors of data and corresponding logical block addresses (LBAs), which are associated with an original order. For example, file system 210 can generate a sector of data 2228 and a corresponding logical block address (LBA) 224. File system 210 can transmit LBA 224 to FTL program 212, and FTL program 212 can assign or generate a PBA 226 corresponding to LBA 224. The host, via FTL program 212 and file system 210, can concatenate sector 228 and PBA 226 to obtain a concatenated data portion. Host memory 230 can store this concatenated data portion. The system can assign consecutive or otherwise ordered or proximal PBAs to the plurality of sectors of the data, which PBAs can be used to maintain the original order of the plurality of sectors of the data. For example, from communications 226 228, host memory 230 can store: a first concatenated data portion which includes a sector 1 232 and a corresponding host-assigned PBA 1 234; and a second concatenated data portion which includes a sector 2 236 and a corresponding host-assigned PBA 2 238.

The system can transmit the various concatenated data portions to SSD controller 250 via multiple queues 1 241-N 244. SSD controller 250 can receive the various concatenated data portions via a host interface 252 (e.g., via the multiple queues 1 241-N 244), and backend logic modules 254 can be configured to process the received data as needed (e.g., processing incoming data using various logic functions). A memory controller 258 can communicate with or be coupled with a DRAM 268 (via a communication 286). DRAM 268 can be used to store received data or data which requires processing by backend logic modules 254 (or processing by other modules, not shown). Memory controller 258 can communicate with host interface 252 and backend logic modules 254 via a communication 280.

Subsequently, a PBA arbiter 256 can receive from backend logic modules 254 the concatenated data portions (via a communication 282). PBA arbiter 256 can be configured to conduct or direct data traffic based on the host-assigned PBA, where each PBA is concatenated to each respective sector of data received by SSD controller 250. PBA arbiter 256 can identify a channel buffer of a plurality of channel buffers to which each sector of data is to be transmitted, and PBA arbiter 256 can send each sector of data to the appropriate channel buffer. The system can store a respective sector of data in the assigned channel buffer (e.g., one of channel buffers 1 260, 2 262, and M 264), and the system can subsequently write data from the assigned channel buffer to the corresponding NAND flash (e.g., one of NANDs 270-274), via a NAND interface 266 and further via corresponding channels 290, 292, and 294. Thus, regardless of the order in which the sectors of data are received by SSD controller 250 via multiple queues 1 241-N 244, the system can write the sectors into the PBAs assigned by the host, which can result in maintaining the original order.

Furthermore, channels buffers 1 260-M 264 (which can be, e.g., SRAM) and DRAM 268 can be battery-backed RAM, such that in the event of a power loss, the system can ensure data consistency, as described below in relation to FIG. 5B.

Figure 3:
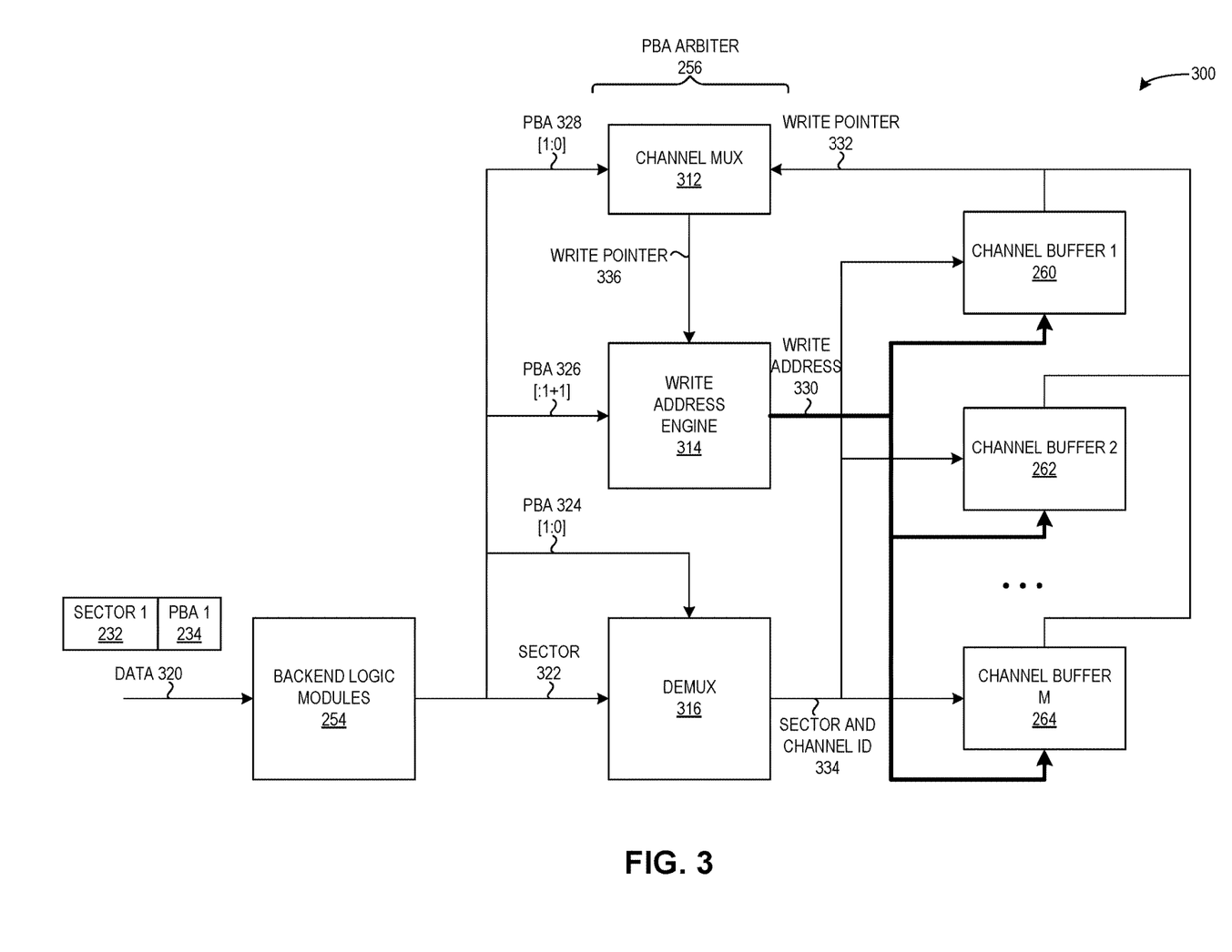
FIG. 3 illustrates an exemplary architecture of a controller, including a PBA arbiter, in accordance with an embodiment of the present application.

Exemplary Controller, Including a PBA Arbiter; Exemplary Organization of a Channel Buffer FIG. 3 illustrates an exemplary architecture of a controller 300, including PBA arbiter 256, in accordance with an embodiment of the present application. Controller 300 can include: backend logic module 254; a channel multiplexer 312; a write address engine 314; a demultiplexer 316; and a plurality of channel buffers, such as channel buffer 1 260, channel buffer 2 262, and channel buffer M 264. PBA arbiter 256 is depicted above in relation to FIG. 2, and can include channel multiplexer 312, write address engine 314, and demultiplexer 316.

During operation, controller 300 can receive data 320, as a sector 1 232 concatenated with a PBA 1 234 (e.g., a concatenated data portion), and backend logic module 254 can process the received data. Demultiplexer 316 can receive both the sector and the PBA (as a sector 322 and a PBA 324), and, based on the PBA, can switch the received sector onto a specific channel per a corresponding channel identifier (e.g., via a sector and channel identifier 334 communication).

At the same time, write address engine 314 can receive the same PBA (as a PBA 326) along with a current write pointer 336, as described below, and can generate a write address 330 of the corresponding sector being held in a respective channel buffer, e.g., in channel buffer 1 260. Each channel buffer can store sectors which are transmitted to the channel buffer based on the determined channel identifier (which is based on the host-assigned PBA), e.g., as received via sector and channel identifier 334. Each channel buffer can also reshuffle the stored sectors, which are received out of order but include a determined write address 330 (based on the host-assigned PBA).

A write pointer 332 can indicate the current sector which is being programmed into the NAND flash. The system can send write pointer 332 to channel multiplexer 312, which can use write pointer 332 and an incoming PBA 328 to compare the current pointer with an incoming sector. Channel multiplexer 312 can send a write pointer 336 to write address engine 314. As described above, write address engine 314 can receive both incoming PBA 326 and write pointer 336, and determine write address 330 (e.g., the appropriate place for the incoming sector in a channel buffer) in order to reshuffle the stored data sectors in each channel buffer into a correct order (e.g., the original order).

Figure 4:
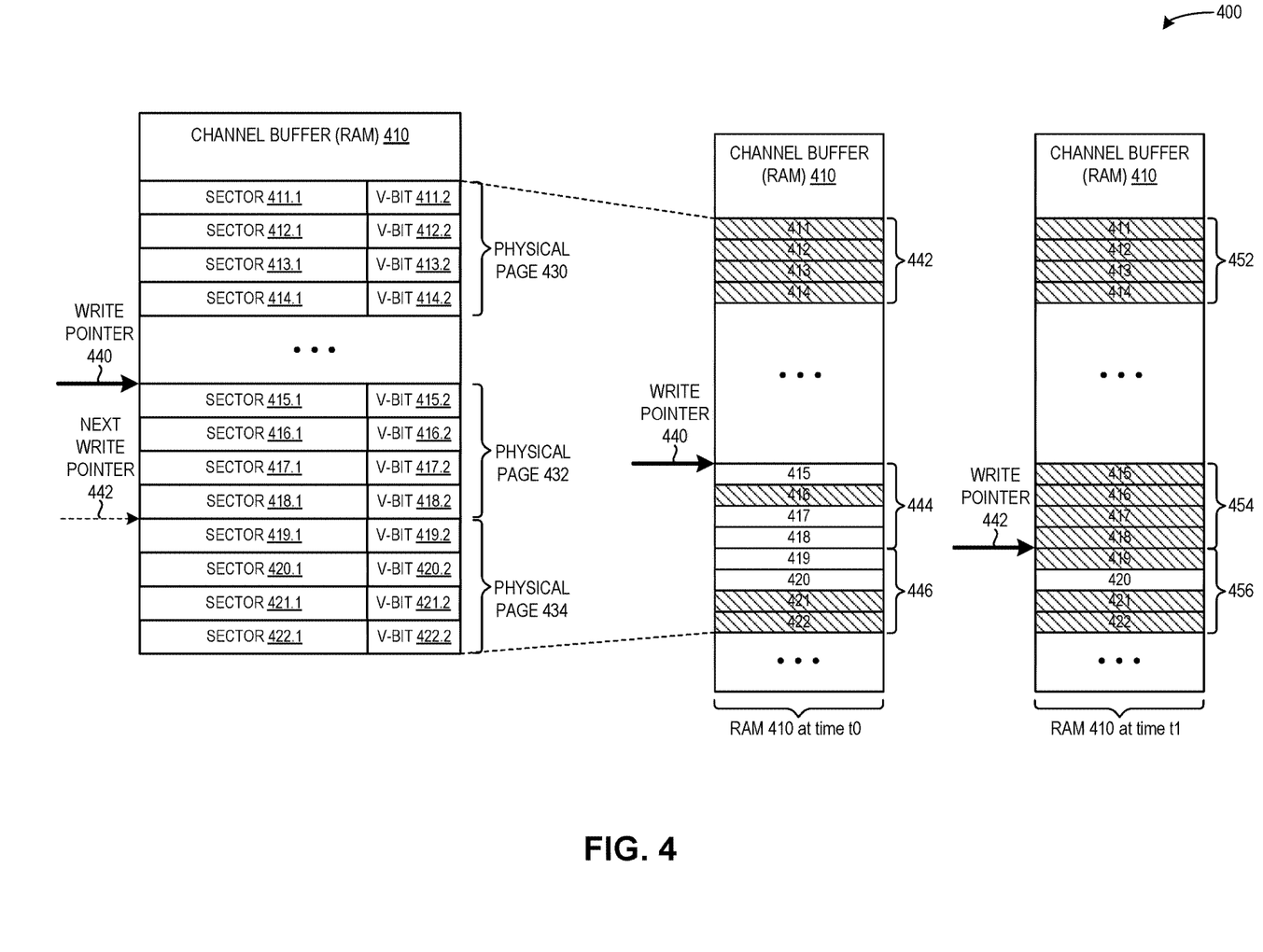
FIG. 4 illustrates an exemplary organization of a channel buffer for data placement and recycling, in accordance with an embodiment of the present application.

FIG. 4 illustrates an exemplary organization 400 of a channel buffer 410 for data placement and recycling, in accordance with an embodiment of the present application. Channel buffer 410 can be a RAM, such as static RAM (SRAM). Multiple sectors can form a single physical unit, e.g., a physical page, and the system can program a single physical unit at the same time. Each sector of data can include a valid bit ("V-bit") which indicates whether the corresponding entry (or the sector of data) is valid or not, i.e., if the value of the data sector is consistent (valid) with what is in memory or not.

For example, channel buffer 410 can include: a sector 411.1 and a corresponding V-bit 411.2; a sector 412.1 and a corresponding V-bit 412.2; a sector 413.1 and a corresponding V-bit 413.2; and a sector 414.1 and a corresponding V-bit 414.2. These sectors 411-414 can form a physical page 430. Similarly, channel buffer can include multiple sectors with corresponding V-bits which form a physical page 432 (sectors 415.1-418.1 and corresponding V-bits 415.2-418.2) and a physical page 434 (sectors 419.1-422.1 and corresponding V-bits 419.2-422.2).

A current write pointer 440 can point to the beginning or start of physical page 432, and a next write pointer 442 can point to the beginning or start of physical page 434. Because channel buffer 410 receives sectors in a random order, any sectors which are behind the write pointer must wait until the corresponding physical page is filled or complete. When the corresponding physical page is filled or complete, the write pointer can move from the start of the physical page to the next physical page (e.g., as indicated by 440 and 442).

When sectors 411-414 arrive and are received by channel buffer 410, the system can initially set to "1" the V-bits 411.2-414.2 corresponding to sectors 411.1-414.1. Sectors 411-414 as stored in channel buffer 410 are indicated as filled in by diagonal left-slanting lines. These sectors 411-414 are written to the NAND flash, and the system can set to "0" the corresponding V-bits of the sectors written to the NAND flash, which status can be subsequently used to recycle or reuse the space in channel buffer 410.

Thus, RAM 410 at a time t0 can include the sectors of data in physical page 442 (e.g., sectors 411-414 of physical page 430) which have been written to the NAND flash, along with any sectors of data in physical pages prior to the position of write pointer 440. Write pointer 440 stays at the beginning of physical page 444 because channel buffer 410 only includes sector 416 (indicated as filled in with diagonal left-slanting lines) and is waiting to receive and store sectors 415, 417, and 418 to fill in or complete physical page 444. Similarly, at time t0, channel buffer 410 only includes sectors 421 and 422 (indicated as filled in with diagonal left-slanting lines) and is waiting to receive and store sectors 419 and 420 to fill in or complete physical page 446.

Subsequently, RAM 410 at a time t1 can indicate that sectors 415-418 were received and stored to fill in or complete physical page 444. These sectors 415-418 are written to the NAND flash as a single physical unit (i.e., as a physical page 454), and the system can set to "0" the corresponding V-bits of the sectors written to the NAND flash. The location of the write pointer moves to the next physical page, as indicated by write pointer 442 in RAM 410 at time t1. At time t1, channel buffer 410 has received and stored sectors 419, 421, and 422, and is still waiting for sector 420 to fill in and complete physical page 456.

Exemplary Method for Facilitating Data Placement and Handling Power Loss

Figure 5A:
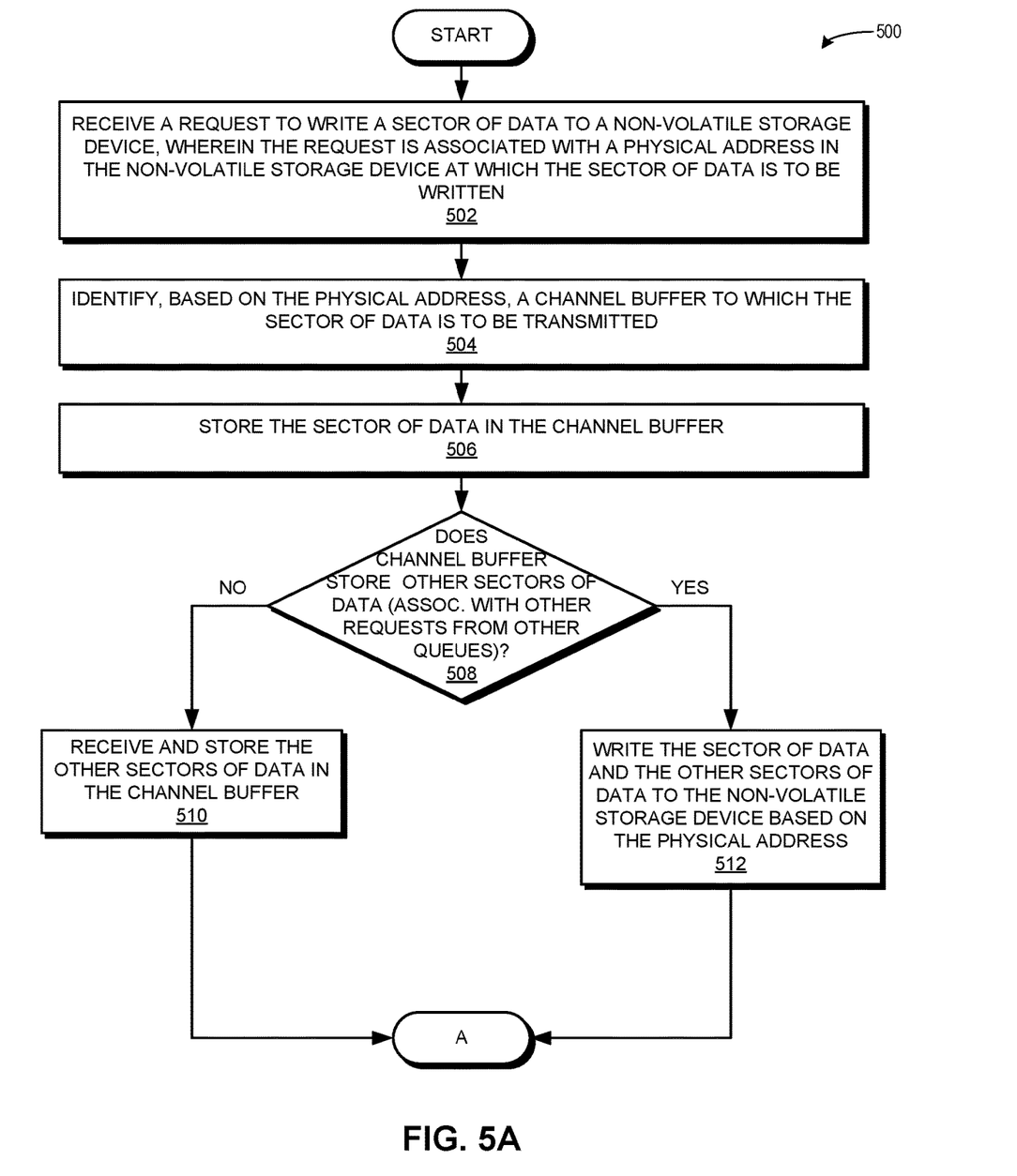
FIG. 5A presents a flowchart illustrating a method for facilitating operation of a storage system, in accordance with an embodiment of the present application.

FIG. 5A presents a flowchart 500 illustrating a method for facilitating operation of a storage system, in accordance with an embodiment of the present application. During operation, the system receives a request to write a sector of data to a non-volatile storage device, wherein the request is associated with a physical address in the non-volatile storage device at which the sector of data is to be written (operation 502). The system identifies, based on the physical address, a channel buffer to which the sector of data is to be transmitted (operation 504). The system stores the sector of data in the channel buffer (operation 506). If the system determines that the channel buffer stores other sectors of data (associated with other requests from other queues) (decision 508), the system writes the sector of data and the other sectors of data to the non-volatile storage device based on the physical address (operation 512), and the operation continues at Label A of FIG. 5B. In some embodiments, a respective request can include the physical address at which the respective sector of data is to be written.

If the system determines that the channel buffer does not store other sectors of data (associated with other requests from other queues) (decision 508) (i.e., that a physical unit is still waiting for an incoming sector or sectors of data to fill or complete the physical unit), the system can receive and store the other sectors of data in the channel buffer (i.e., wait and receive/store the other sectors of data in the open physical unit) (operation 510). The operation continues as described at Label A of FIG. 5B.

Figure 5B:
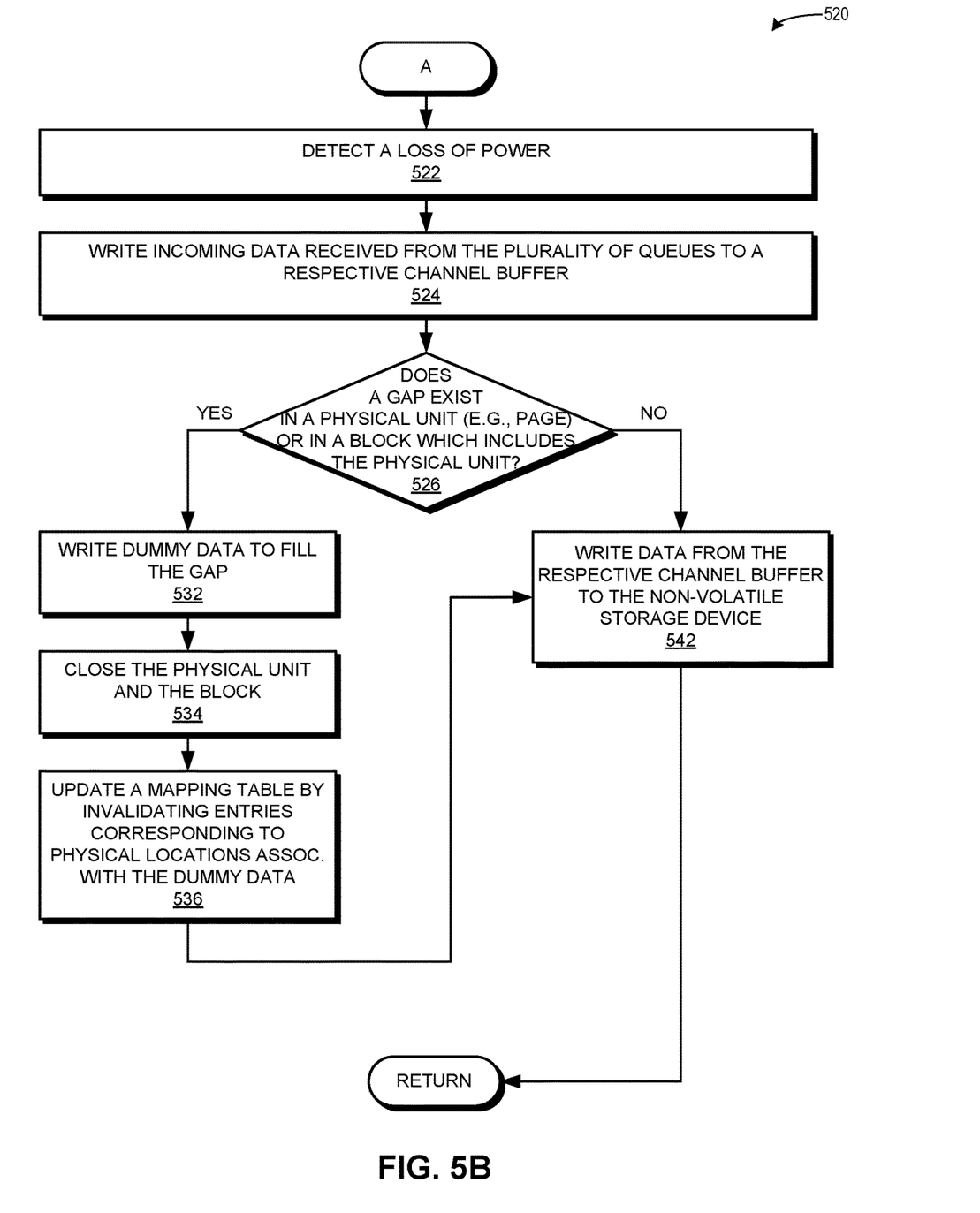
FIG. 5B presents a flowchart illustrating a method for facilitating operation of a storage system, in accordance with an embodiment of the present application.

FIG. 5B presents a flowchart 520 illustrating a method for facilitating operation of a storage system, in accordance with an embodiment of the present application. During operation, the system detects a loss of power (operation 522). The system writes incoming data received from a plurality of queues to a respective channel buffer (operation 524). If a gap exists in a physical unit (e.g., a page) or in a block in which includes the physical unit (decision 526), the system writes dummy data to fill the gap (operation 532), closes the physical unit and the block (operation 534), and updates a mapping table by invalidating entries corresponding to physical locations associated with the dummy data (operation 536). The operation continues at operation 542.

If a gap does not exist in a physical unit (e.g., a page) or in a block in which includes the physical unit (decision 526), the system writes data from the respective channel buffer to the non-volatile storage device (operation 542), as described above in relation to FIG. 4. The system can determine whether a gap exists in a physical unit by one or more of: identifying a first gap between a write pointer and a last valid sector of the second physical unit; and identifying a second gap between a last valid sector and an end of the second unit or the block. The system can subsequently fill in one or both of the first gap and the second gap. The sectors which are filled with dummy data (e.g., the first and second gaps) can be marked as invalid, and are thus ready for recycling in a future garbage collection process performed on a respective NAND block.

Exemplary Computer System and Apparatus

Figure 6:
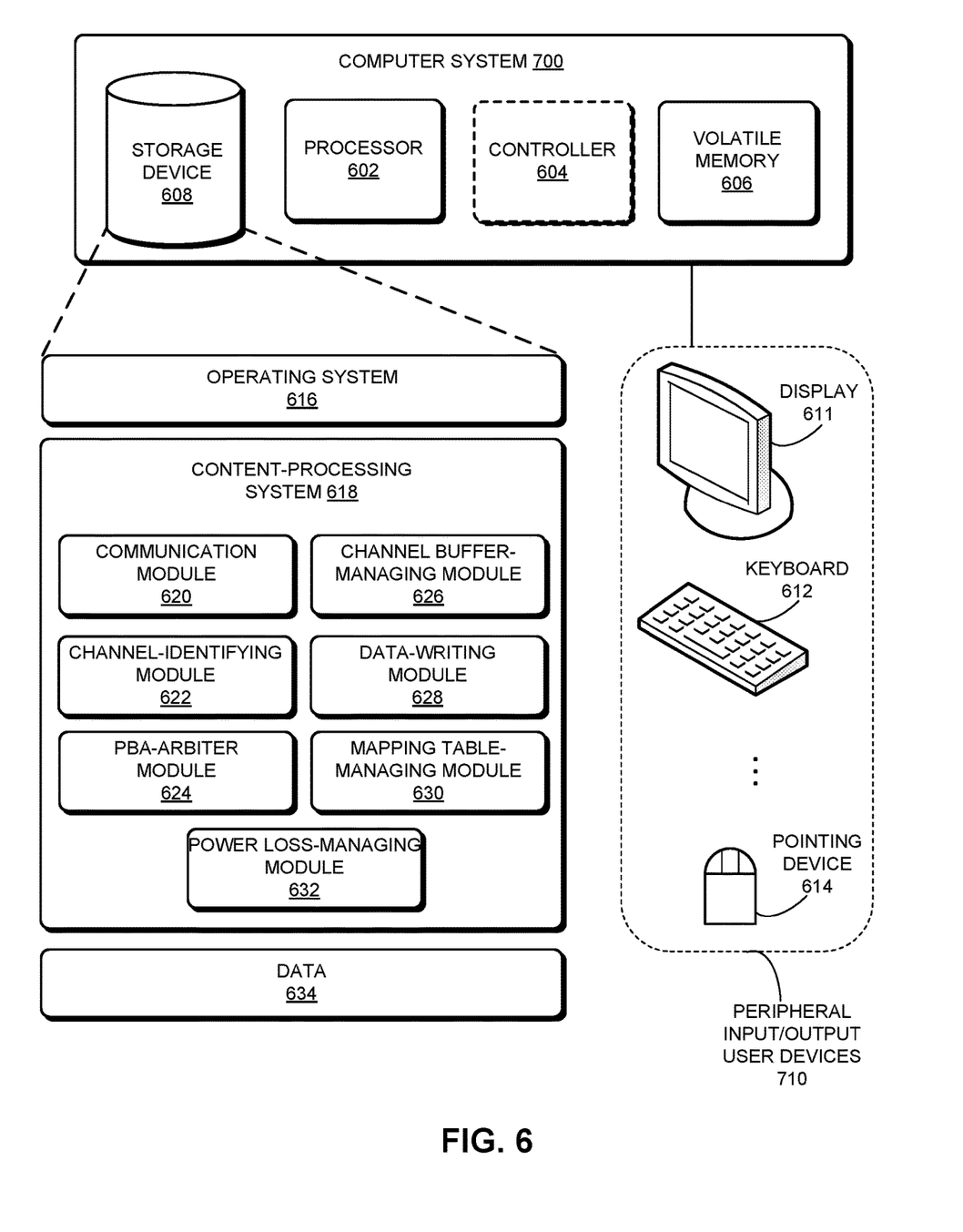
FIG. 6 illustrates an exemplary computer system that facilitates operation of a storage system, in accordance with an embodiment of the present application.

FIG. 6 illustrates an exemplary computer system 600 that facilitates operation of a storage system, in accordance with an embodiment of the present application. Computer system 600 includes a processor 602, a volatile memory 606, and a storage device 608. In some embodiments, computer system 600 can include a controller 604 (indicated by the dashed lines). Volatile memory 606 can include, e.g., random access memory (RAM), that serves as a managed memory, and can be used to store one or more memory pools. Storage device 608 can include persistent storage which can be managed or accessed via processor 602 (or controller 604). Furthermore, computer system 600 can be coupled to peripheral input/output (I/O) user devices 610, e.g., a display device 611, a keyboard 612, and a pointing device 614. Storage device 608 can store an operating system 616, a content-processing system 618, and data 634.

Content-processing system 618 can include instructions, which when executed by computer system 600, can cause computer system 600 or processor 602 to perform methods and/or processes described in this disclosure. Specifically, content-processing system 618 can include instructions for receiving and transmitting data packets, including data to be read or written, an input/output (I/O) request (e.g., a read request or a write request), a sector of data, a physical block address, and a channel identifier (communication module 620).

Content-processing system 618 can further include instructions for receiving a request to write a sector of data to a non-volatile storage device, wherein the request is associated with a physical address in the non-volatile storage device at which the sector of data is to be written (communication module 620). Content-processing system 618 can include instructions for identifying, based on the physical address, a channel buffer to which the sector of data is to be transmitted (channel-identifying module 622 and PBA-arbiter module 624). Content-processing system 618 can also include instructions for storing the sector of data in the channel buffer (channel buffer-managing module 626). Content-processing system 618 can include instructions for, responsive to determining that the channel buffer stores other sectors (channel buffer-managing module 626), writing the sector of data and the other sectors of data to the non-volatile storage device based on the physical address (data-writing module 628).

Content-processing system 618 can additionally include instructions for generating a PBA based on an LBA, mapping LBAs to PBAs in a mapping table, and updating the mapping table (mapping table-managing module 630). Content-processing system 618 can include instructions for selecting a channel associated with the channel buffer (PBA-arbiter module 624) and writing the sector of data and the other sectors of data via the channel to the non-volatile storage device (data-writing module 628).

Content-processing system 618 can further include instructions for detecting a loss of power (power loss-managing module 632). Content-processing system 618 can include instructions for writing incoming data received from a plurality of queues to a respective channel buffer (modules 622, 624, and 626). Content-processing system 618 can include instructions for, responsive to determining, in the respective channel buffer, that a gap exists in a second physical unit or in a block which includes the second physical unit (channel-buffer managing module 626): writing dummy data to fill the gap (channel buffer-managing module 626); closing the second physical unit and the block (channel buffer-managing module 626); and updating a mapping table by invalidating entries corresponding to physical locations associated with the dummy data (mapping table-managing module 630). Content-processing system 618 can also include instructions for writing data from the respective channel buffer to the non-volatile storage device (data-writing module 634).

Data 634 can include any data that is required as input or generated as output by the methods and/or processes described in this disclosure. Specifically, data 634 can store at least: data; a logical block address (LBA); a physical block address (PBA); a sector of data; a concatenated data portion which includes a sector of data and a corresponding PBA; a request; a read request; a write request; an input/output (I/O) request; data or metadata associated with a read request, a write request, or an I/O request; an indicator of a channel buffer; a channel identifier; a write address; an indicator of a position of a current write pointer or a next write pointer; a host-assigned PBA or a host-side FTL-assigned PBA; a mapping table; a mapping of an LBA to a PBA assigned by a host; a valid bit or a V-bit corresponding to a sector of data; an indicator of whether a sector of data or an entry has been written to a non-volatile storage device; a logical function; an indicator of a queue or queues; an original or fixed order for sectors of data; a random order for sectors of data; dummy data or a dummy pattern; a physical unit or a physical page of data; a block; a valid entry; an invalid entry; a gap between sectors of data; a first gap between a write pointer and a last valid sector of a physical unit or page; and a second gap between a last valid sector and an end of a physical unit or page or block.

Figure 7:
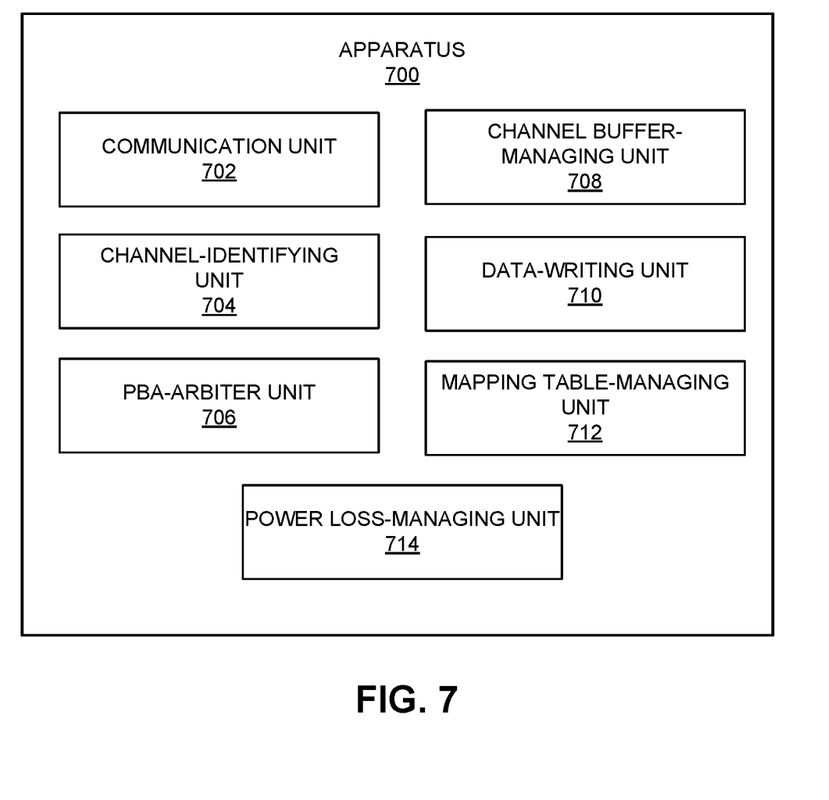
FIG. 7 illustrates an exemplary apparatus that facilitates operation of a storage system, in accordance with an embodiment of the present application.

FIG. 7 illustrates an exemplary apparatus 700 that facilitates operation of a storage system, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Furthermore, apparatus 700 may be integrated in a computer system, or realized as a separate device or devices capable of communicating with other computer systems and/or devices.

Apparatus 700 can comprise modules or units 702-714 which are configured to perform functions or operations similar to modules 620-632 of computer system 600 of FIG. 6, including: a communication unit 702; a channel-identifying unit 704; a PBA-arbiter unit 706; a channel buffer-managing unit 708; a data-writing unit 710; a mapping table-managing unit 712; and a power loss-managing unit 714.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving, via a first queue of a plurality of queues, a request to write a sector of data to a non-volatile storage device, wherein the request is associated with a physical address in the non-volatile storage device at which the sector of data is to be written;
identifying, based on the physical address, a channel buffer to which the sector of data is to be transmitted;
storing the sector of data in the channel buffer; and
responsive to determining that the channel buffer stores other sectors, writing the sector of data and the other sectors of data to the non-volatile storage device based on the physical address,
wherein determining that the channel buffer stores the other sectors comprises:
receiving, via other queues of the plurality of queues, other requests to write the other sectors of data to the non-volatile storage device,
wherein the other requests are associated with physical addresses in the non-volatile storage device at which the other sectors of data are to be written, and
wherein the other requests are received in a first order which is different from a second order in which the physical address for the sector of data and the physical addresses for the other sectors of data are assigned; and
storing the other sectors of data in the channel buffer based on the physical addresses associated with the other requests.

2. The method of claim 1,
wherein the physical address associated with the request is assigned by a host,
wherein the host determines the physical address based on a logical address for the data, and
wherein a flash translation layer module associated with the host maintains a mapping of the logical address to the assigned physical address.

3. The method of claim 1, wherein the request to write the sector is received by a controller.

4. The method of claim 1, wherein prior to identifying the channel buffer, the method further comprises:
processing the sector of data based on a logic module.

5. The method of claim 1,
wherein the physical address for the sector of data and the physical addresses for the other sectors of data are assigned in a fixed order; and
wherein the sector of data and the other sectors of data are written to the non-volatile storage device based on the assigned fixed order.

6. The method of claim 1, wherein writing the sector of data and the other sectors of data comprises:
selecting a channel associated with the channel buffer; and
writing the sector of data and the other sectors of data via the channel to the non-volatile storage device.

7. The method of claim 1, wherein the sector of data and the other sectors of data are written to the non-volatile storage device as a first physical unit,
wherein a physical unit comprises a page of the non-volatile storage device.

8. The method of claim 7, wherein the first channel buffer comprises a battery-backed random-access memory, and wherein the method further comprises:
detecting a loss of power;
writing incoming data received from a plurality of queues to a respective channel buffer;
responsive to determining, in the respective channel buffer, that a gap exists in a second physical unit or in a block which includes the second physical unit:
writing dummy data to fill the gap;
closing the second physical unit and the block; and updating a mapping table by invalidating entries corresponding to physical locations associated with the dummy data; and writing data from the respective channel buffer to the non-volatile storage device.

9. The method of claim 8, wherein determining that the gap exists comprises one or more of:

identifying a first gap between a write pointer and a last valid sector of the second physical unit; and identifying a second gap between a last valid sector and an end of the second unit or the block.

10. A computer system, comprising:

a processor; and a memory coupled to the processor and storing instructions which, when executed by the processor, cause the processor to perform a method, the method comprising:

receiving, via a first queue of a plurality of queues, a request to write a sector of data to a non-volatile storage device, wherein the request is associated with a physical address in the non-volatile storage device at which the sector of data is to be written;

identifying, based on the physical address, a channel buffer to which the sector of data is to be transmitted;

storing the sector of data in the channel buffer; and responsive to determining that the channel buffer stores other sectors, writing the sector of data and the other sectors of data to the non-volatile storage device based on the physical address, wherein determining that the channel buffer stores the other sectors comprises:

receiving, via other queues of the plurality of queues, other requests to write the other sectors of data to the non-volatile storage device, wherein the other requests are associated with physical addresses in the non-volatile storage device at which the other sectors of data are to be written, and wherein the other requests are received in a first order which is different from a second order in which the physical address for the sector of data and the physical addresses for the other sectors of data are assigned; and storing the other sectors of data in the channel buffer based on the physical addresses associated with the other requests.

11. The computer system of claim 10, wherein the physical address associated with the request is assigned by a host, wherein the host determines the physical address based on a logical address for the data, and wherein a flash translation layer module associated with the host maintains a mapping of the logical address to the assigned physical address.

12. The computer system of claim 10, wherein the physical address for the sector of data and the physical addresses for the other sectors of data are assigned in a fixed order; and wherein the sector of data and the other sectors of data are written to the non-volatile storage device based on the assigned fixed order.

13. The computer system of claim 10, wherein writing the sector of data and the other sectors of data comprises:

selecting a channel associated with the channel buffer; and writing the sector of data and the other sectors of data via the channel to the non-volatile storage device.

14. The computer system of claim 10, wherein the sector of data and the other sectors of data are written to the non-volatile storage device as a first physical unit, wherein a physical unit comprises a page of the non-volatile storage device.

15. The computer system of claim 14, wherein the first channel buffer comprises a battery-backed random-access memory, and wherein the method further comprises:

detecting a loss of power;

writing incoming data received from a plurality of queues to a respective channel buffer;

responsive to determining, in the respective channel buffer, that a gap exists in a second physical unit or in a block which includes the second physical unit:

writing dummy data to fill the gap;

closing the second physical unit and the block; and updating a mapping table by invalidating entries corresponding to physical locations associated with the dummy data; and writing data from the respective channel buffer to the non-volatile storage device.

16. The computer system of claim 15, wherein determining that the gap exists comprises one or more of:

identifying a first gap between a write pointer and a last valid sector of the second physical unit; and identifying a second gap between a last valid sector and an end of the second unit or the block.

17. An apparatus, comprising:

a communication module configured to receive a request to write a sector of data to a non-volatile storage device, wherein the request is associated with a physical address in the non-volatile storage device at which the sector of data is to be written, wherein the physical address for the sector of data and physical addresses for the other sectors of data are assigned in a fixed order;

a channel-identifying module configured to identify, based on the physical address, a channel buffer to which the sector of data is to be transmitted;

a channel buffer-managing module configured to store the sector of data in the channel buffer;

a PBA-arbiting module configured to select a channel associated with the channel buffer; and a data-writing module configured to write the sector of data and the other sectors of data to the non-volatile storage device via the selected channel at the physical address and the physical addresses based on the assigned fixed order, responsive to the channel buffer-managing module determining that the channel buffer stores other sectors.

* * * * *